(12) United States Patent
Mochizuki

(10) Patent No.: US 8,744,257 B2
(45) Date of Patent: Jun. 3, 2014

(54) LENS APPARATUS INCLUDING FOCUS OPERATION DEVICE AND FOCUS OPERATION DEVICE

(71) Applicant: Canon Kabushiki Kaisha, Tokyo (JP)

(72) Inventor: Chihiro Mochizuki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/847,067

(22) Filed: Mar. 19, 2013

(65) Prior Publication Data

US 2013/0216214 A1    Aug. 22, 2013

Related U.S. Application Data

(63) Continuation of application No. 13/186,596, filed on Jul. 20, 2011, now Pat. No. 8,417,108.

(30) Foreign Application Priority Data

Jul. 29, 2010   (JP) .................................. 2010-170425

(51) Int. Cl.
  *G03B 3/10*   (2006.01)
(52) U.S. Cl.
  USPC ........................................................... 396/133
(58) Field of Classification Search
  USPC ........................................ 396/133, 131, 331
  See application file for complete search history.

(56) References Cited

U.S. PATENT DOCUMENTS

| 5,231,449 | A  | * | 7/1993 | Nomura ......................... 396/542 |
| 2002/0135887 | A1 | * | 9/2002 | Nomura et al. ................. 359/699 |
| 2007/0024989 | A1 | * | 2/2007 | Kageyama ..................... 359/699 |
| 2007/0147818 | A1 | * | 6/2007 | Mori .............................. 396/144 |

FOREIGN PATENT DOCUMENTS

| JP | 2131208 A | 5/1990 |
| JP | 2000111783 A | 4/2000 |

* cited by examiner

*Primary Examiner* — Clayton E Laballe
*Assistant Examiner* — Dennis Hancock
(74) *Attorney, Agent, or Firm* — Rossi, Kimms & McDowell LLP

(57) ABSTRACT

A lens apparatus includes: an optical member; a driving unit; a position detector; a rotary operation portion; a projection portion to be rotated interlockingly with the operation portion; an operation portion rotation detector; a driving controller for controlling the driving unit based on an amount of an operation of the operation portion; rotatable first (second) pins; first (second) side locking units; and a lock controller for controlling both the locking units based on a position of the optical member and a rotating direction of the operation portion. The projection portion is provided between the first regulation pin and the second regulation pin. The first regulation pin and the second regulation pin are elastically connected to each other. The lock controller locks the first (second) side locking unit when the focus unit reaches a first (second) end while the operation portion is operated toward the first (second) end.

7 Claims, 6 Drawing Sheets

LENS APPARATUS INCLUDING FOCUS OPERATION DEVICE AND FOCUS OPERATION DEVICE

BACKGROUND OF THE INVENTION

1. Field of the Invention

The present invention relates to a lens apparatus capable of performing a manual focus operation and an autofocus operation and a focus operation device for performing the manual focus operation, in particular, a lens apparatus including a rotary operation portion for the manual focus operation and a focus operation device for performing the manual focus operation.

2. Description of the Related Art

A broadcast television camera conventionally has a manual focus mode and an autofocus mode for focusing and is used by switching a focus mode between the manual focus mode and the autofocus mode as needed. The manual focus is an absolute position control which basically includes a one-to-one relation between a focus position and a physical position of an operation portion to be operated by an operator. The operation portion includes a regulation member for limiting the operation range of the operation portion. The autofocus does not need to perform the absolute position control which requires an absolute rotational position of the operation portion. Therefore, when the focus mode is switched from the autofocus mode to the manual focus mode, the focus position moves so as to correspond to the physical position of the operation portion. Thus, a relative relationship between the focus position and a lens position is not maintained to result in a focus error.

Therefore, in order to enable smooth switching from the autofocus mode to the manual focus mode without generating discomfort in the focus operation, the regulation member is required to limit the range of operation according to the position of the lens so as to correspond to a state at the time of switching to the manual focus mode.

Japanese Patent Application Laid-Open No. H02-131208 discloses an electronic ring provided in place of the regulation member. The electronic ring is configured so as to be rotatable by 360 degrees and to generate a focus driving signal by rotational movement. When the electronic ring reaches a limit end of the operation, a load is applied to the electronic ring by a piezoelectric actuator in a thrust direction to lock the electronic ring so as to correct the range of operation.

Japanese Patent Application Laid-Open No. 2000-111783 discloses a focus controller including a stopper pin for limiting the range of operation. The stopper pin is provided on a gear to drive a motor so as to maintain a relative relationship between the position of an operation portion and a lens position.

According to the related art disclosed in Japanese Patent Application Laid-Open No. H02-131208 described above, however, when a user instantaneously performs a reversal operation from a close end or an infinite end in the opposite direction, the release of locking of the piezoelectric actuator is not performed quickly enough. As a result, the reversal operation is inhibited.

According to the related art disclosed in Japanese Patent Application Laid-Open No. 2000-111783, when the focus operation is limited not to one revolution but to multiple revolutions, the motor is disadvantageously increased in size or a structure is complicated to follow an operation speed of the user (to maintain the relative relationship). As a result, it is conceivable that the maintenance of the relative relationship itself cannot be achieved.

Moreover, when a conventional endless operation ring is used, an allowable range of operation cannot be known. As a result, operability is degraded.

SUMMARY OF THE INVENTION

In view of the problems described above, the present invention has an object to provide an operation portion capable of performing a seamless operation while maintaining a relative position between a lens position and an operation position without degrading operability of a reversal operation from a close end or an infinite end in the focus operation portion capable of performing switching between an autofocus operation and a manual focus operation. In order to achieve the above-mentioned object, a lens apparatus, comprising: an optical member; a driving unit for driving the optical member; a position detector for detecting a position of the optical member; an operation portion to be rotated so as to manually operate the optical member; a projection portion to be rotated interlockingly with an operation of the operation portion; a rotation detector for detecting rotation of the operation portion; a driving controller for controlling the driving unit so as to drive the optical member based on an amount of the operation of the operation portion, the amount being detected by the rotation detector; a first regulator rotatable about the same axis of rotation as an axis of rotation of the projection portion, the first regulator including a first regulation pin provided on a side of a first end of the projection portion in a rotating direction; a second regulator rotatable about the same axis of rotation as the axis of rotation of the projection portion, the second regulator including a second regulation pin provided on a side of a second end of the projection portion in the rotating direction; a first locking unit for locking rotation of the first regulator; a second locking unit for locking rotation of the second regulator; and a lock controller for controlling the locking of each of the first locking unit and the second locking unit based on the position of the optical member from the position detector and a rotating direction of the operation portion from the rotation detector, wherein the projection portion is provided between the first regulation pin and the second regulation pin in the rotating direction of the projection portion; wherein the first regulation pin and the second regulation pin are elastically connected to each other by an elastic force generated by a first elastic member, the elastic force acting in a direction in which a distance between the first regulation pin and the second regulation pin is reduced; and wherein the lock controller locks the rotation of the first regulator by the first locking unit when the optical member reaches the first end while the operation portion is operated in a direction to the first end, and locks the rotation of the second regulator by the second locking unit when the optical member reaches the second end while the operation portion is operated in a direction to the second end.

According to the present invention, it is possible to provide an operation portion capable of performing a seamless operation while maintaining a relative position between a lens position and a position of operation without degrading operability of a reversal operation from a close end or an infinite end in the focus operation portion capable of performing switching between an autofocus operation and a manual focus operation.

Further features of the present invention will become apparent from the following description of exemplary embodiments with reference to the attached drawings.

DESCRIPTION OF THE EMBODIMENTS

Figure 1:
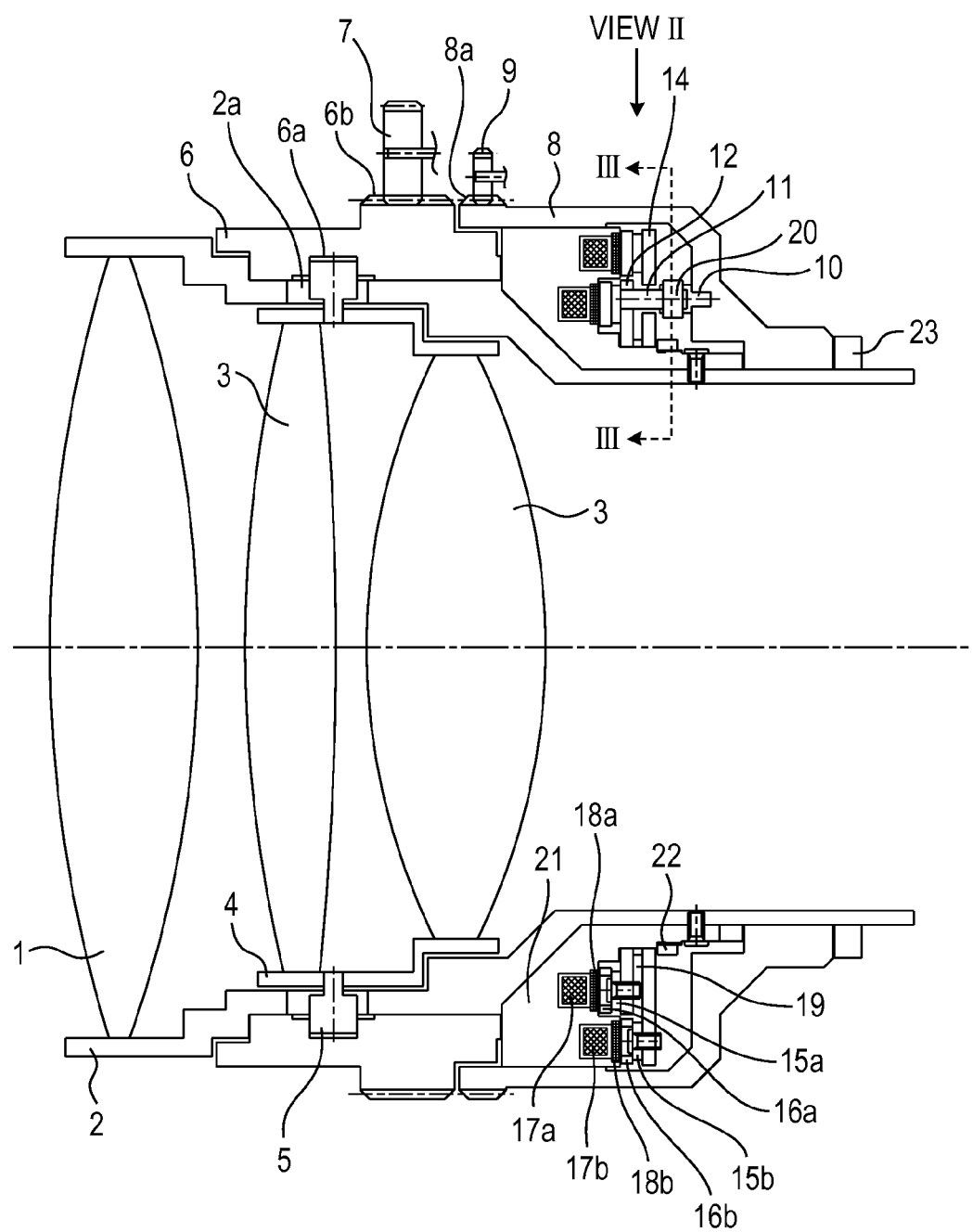
FIG. 1 is a sectional view of a focus portion of a zoom lens according to a first embodiment of the present invention.

Hereinafter, preferred embodiments of the present invention are described in detail based on the accompanying drawings. FIG. 1 is a sectional view of a focus portion of a zoom lens according to the embodiments of the present invention.

First Embodiment

Hereinafter, referring to FIGS. 1 to 5C, described are a mechanism for limiting the operation range when a manual focus operation is performed, a flowchart of control of timing for the limitation, and an interlocking operation of a regulation mechanism portion at the time of a reversal operation of a focus unit according to a first embodiment of the present invention.

Figure 2:
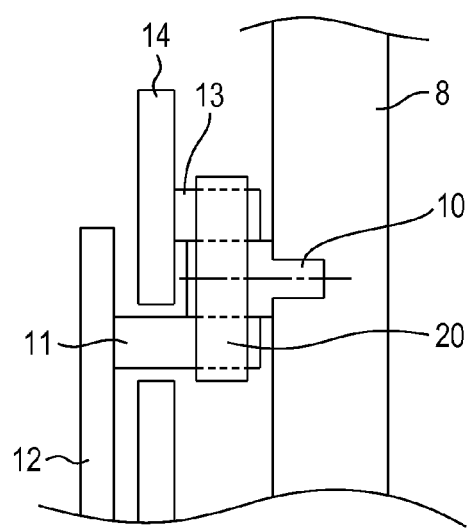
FIG. 2 is a sectional view of a focus controller according to the first embodiment, viewed from the arrow II of FIG. 1.
Figure 3:
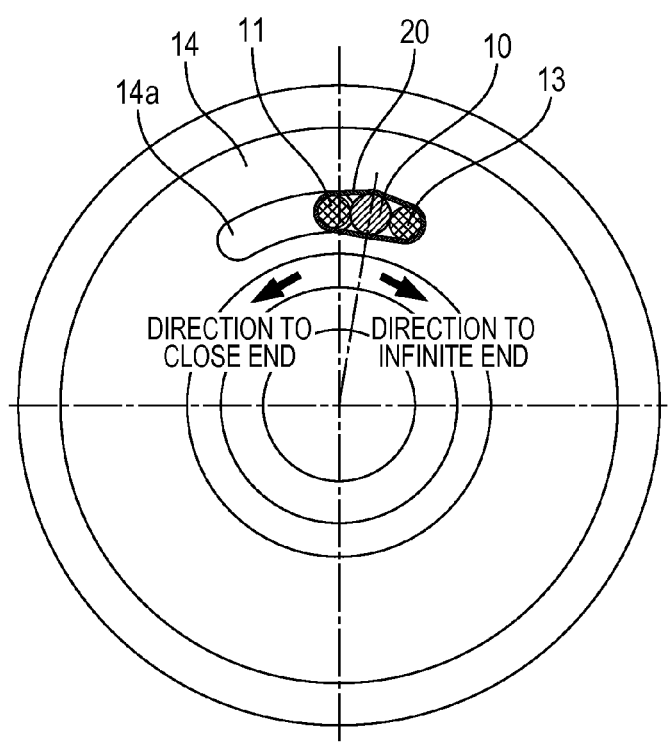
FIG. 3 is a detailed sectional view illustrating the connection between a projection portion and regulation pins according to the first embodiment, taken along the line III-III of FIG. 1.

In FIGS. 1 to 3, the focus unit includes a fixed focus lens 1 which is immovably retained by a fixed lens barrel 2, and a driven focus lens unit 3 retained by a movable driven lens barrel 4.

A driving roller 5 fixed to the driven lens barrel 4 is engaged with a straight groove 2a and a cam groove 6a of a cam ring 6. Moreover, the cam ring 6 is engaged with the fixed lens barrel 2, so as to be retained in a rotatable state. Therefore, the driven focus lens unit 3 is movable in an optical axis direction.

A focus driving motor gear 7 is fixed to a driving motor (not shown) as a driving unit and is engaged with a cam ring gear 6b, so as to drive the driven focus lens unit 3 in response to a focus command signal for an autofocus operation, a manual focus operation, or the like.

A focus ring 8 is an operation portion for performing a manual focus operation and is rotatably supported onto a main body 2 by a retaining ring 23 which prevents the focus ring 8 from being removed from the main body 2.

An encoder gear 9 connected to an encoder (not shown) as a rotation detector for the focus ring 8 is engaged with a focus ring gear 8a and transmits a manual operation signal of the focus ring 8 to the encoder. In this manner, the driven focus lens unit 3 can be driven by the motor.

A close side brake disc 12 and an infinite side brake disc 14 are engaged with and supported by an electromagnetic brake unit case 21 fixed to the fixed lens barrel 2 in a state in which the close side brake disc 12 and the infinite side brake disc 14 are rotatable about the same axis of rotation as that of the focus ring 8. Moreover, the close side brake disc 12 and the infinite side brake disc 14 are supported by a retaining ring 22 so as not to be removed from the electromagnetic brake unit case 21.

The focus ring 8 includes a projection portion 10 (which may be the same member as the focus ring or may be a member different from the focus ring) configured integrally therewith (or rotating interlockingly with the rotation of the focus ring 8). The close side brake disc 12 includes a close side regulation pin 11 configured integrally therewith, whereas the infinite side brake disc 14 includes an infinite side regulation pin 13 configured integrally therewith. The close side regulation pin 11 and the infinite side regulation pin 13 are provided on both sides of the projection portion 10 in a rotating direction of the projection portion 10. Specifically, the pins (regulation pins, regulators) are configured so that the close side regulation pin 11 is located on the close side in the rotating direction of the projection portion 10 and the infinite side regulation pin 13 is located on the infinite side in the rotating direction of the projection portion 10. With the configuration described above, the projection portion 10 (focus ring 8) cannot rotate to the close side beyond the close side regulation pin 11 and to the infinite side beyond the infinite side regulation pin 13.

An armature disc 16a is fixed to the close side brake disc 12 through an intermediation of a spring disc 15a, whereas an armature disc 16b is fixed to the infinite side brake disc 14 through an intermediation of a spring disc 15b.

Electromagnetic coils 17a and 17b and friction pads 18a and 18b respectively corresponding to the electromagnetic coils 17a and 17b are fixed to the electromagnetic brake unit case 21. The electromagnetic coil 17a is provided at a position so as to be opposed to the armature disc 16a through the friction pad 18a, whereas the electromagnetic coil 17b is provided at a position so as to be opposed to the armature disc 16b through the friction pad 18b. When the electromagnetic coil 17a is energized, the armature disc 16a comes into contact with the friction pad 18a by an electromagnetic force to lock the rotation of the brake disc 12. On the other hand, when the electromagnetic coil 17b is energized, the armature disc 16b comes into contact with the friction pad 18b by an electromagnetic force to lock the rotation of the brake disc 14. When the electromagnetic coils 17a and 17b are de-energized, the armature discs 16a and 16b are separated away respectively from the friction pads 18a and 18b by elastic forces of the spring discs 15a and 15b to release the locking of the rotation of the brake discs 12 and 14.

Specifically, the electromagnetic coil 17a is used to lock the rotation of the close side brake disc 12 whereas the electromagnetic coil 17b is used to lock the rotation of the infinite side brake disc 14.

A spacer 19 is provided between the close side brake disc 12 and the infinite side brake disc 14 so as to allow each of the brake discs 12 and 14 to rotate independently. The infinite side brake disc 14 has a through hole 14a which is elongated in the rotating direction of the disc. The close side regulation pin 11 fixed to the close side brake disc 12 extends through the through hole 14a. As a result, the close side brake disc 12 and the infinite side brake disc 14 can rotate relative to each other within a predetermined range of rotation angle without the interference of the close side regulation pin 11 with the infinite side brake disc 14.

An elastic retention member (first elastic member) 20 is an interlocking unit which elastically retains the regulation pins 11 and 13 so as to operate interlockingly with the projection portion 10. The elastic retention member 20 includes an elastic member surrounding the close side regulation pin 11, the projection portion 10, and the infinite side regulation pin 13, which are arranged in the rotating direction. When the focus ring 8 (projection portion 10) is operated, one of the regulation pins (brake discs), which is present in a direction in which the projection portion 10 moves, is pushed by the projection portion 10 to be rotated. The other regulation pin (brake disc) present in a direction opposite to the direction in which the projection portion 10 moves is rotated to follow the projection portion 10 by a tensile force of the elastic retention member 20. Specifically, the close side brake disc 12 and the infinite side brake disc 14 rotate along with the rotation of the focus ring 8.

When the driven focus lens unit is operated in an autofocus mode in the above-mentioned configuration, the cam ring 6 is rotated by the motor in response to an autofocus command signal to drive the driven focus lens unit 3.

At this time, position information of the driven focus lens group 3, which is detected by a position detector (not shown), is constantly transmitted to a central processing unit (CPU) (not shown).

Next, for manually performing a focus operation in a manual focus mode, the focus ring 8 is manually rotated. Then, the rotation of the focus ring 8 is transmitted to the encoder through an intermediation of the encoder gear 9 connected thereto through the focus ring gear 8a. The CPU (not shown) corresponding to a driving control unit outputs a manual focus command signal based on an output from the encoder, which corresponds to the amount of operation of the focus ring 8.

The motor as the driving unit is driven in response to the manual focus command signal to rotate the cam ring 6 to drive the driven focus lens unit 3.

For example, the case where the driven focus lens unit 3 reaches the close end while the focus ring 8 is being rotated by a manual operation in a direction to the close end is considered. The position information of the driven focus lens unit 3, which is detected by the position detector (not shown), is constantly transmitted to the CPU (not shown). Therefore, at the moment when the driven focus lens unit 3 reaches the close end, the CPU (not shown), which also serves as a lock control unit, allows the energization of the electromagnetic coil 17a to lock the close side brake disc 12. The projection portion of the focus ring 8 abuts against the close side regulation pin 11 fixed to the close side brake disc 12. As a result, the rotation of the focus ring 8 in the direction to the close end is disabled.

Thereafter, when the focus ring 8 is started to rotate in the direction to the infinite end, the locking of the close side brake disc 12 is released. Then, when the driven focus lens unit 3 reaches the infinite end while the focus ring 8 is being rotated in the direction to the infinite end by the manual operation, the same effects are generated for the infinite side brake disc 14.

Figure 4:
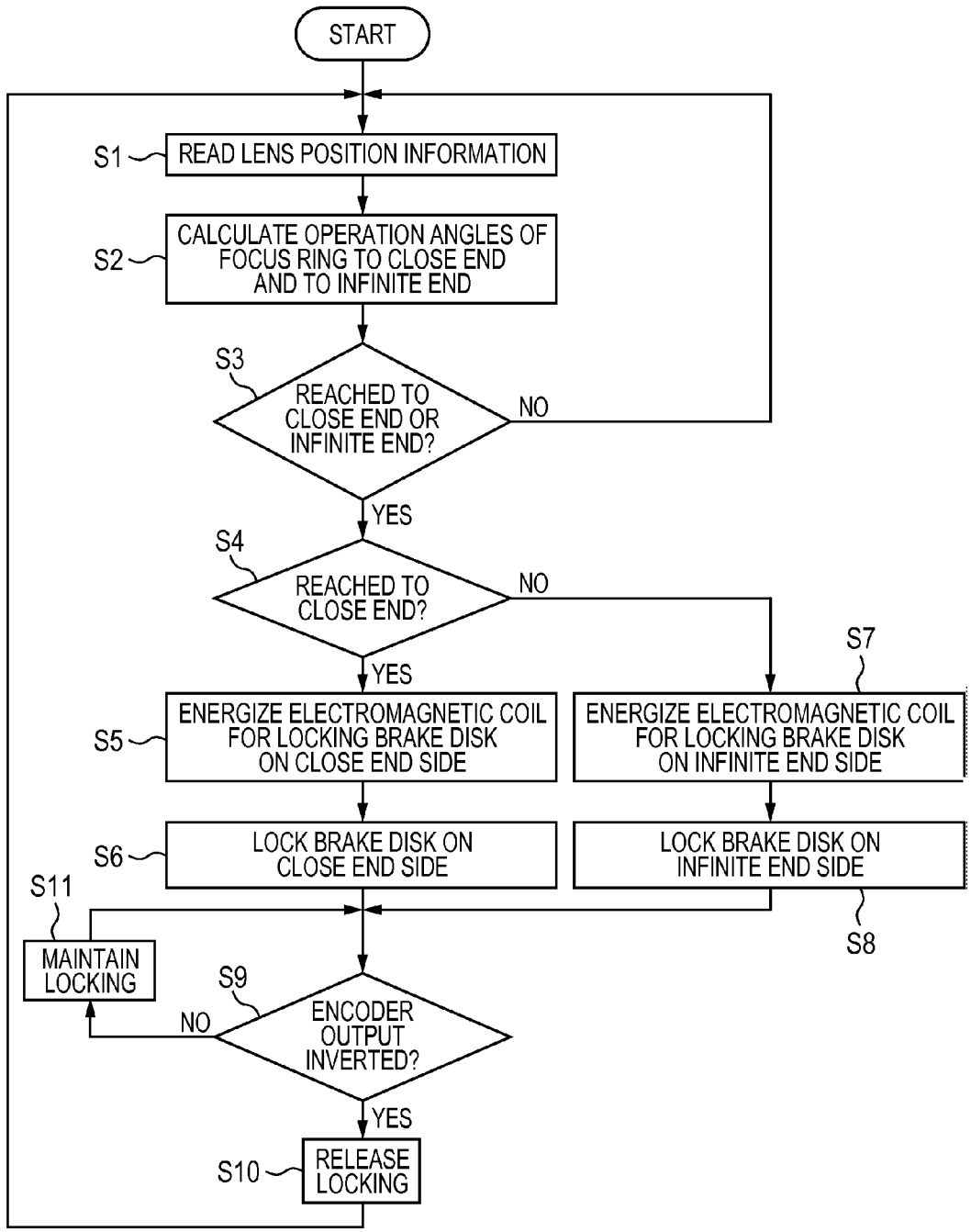
FIG. 4 is a flowchart of lock control of the regulation pins according to the first embodiment.

Referring to FIG. 4, a flowchart of the above-mentioned effects is described.

When the focus operation is performed, a process proceeds to Step S1 where the position information of the driven focus lens unit 3 is read into the CPU.

In Step S2, operation angles of the focus ring 8 to the close end and to the infinite end are calculated from the position information.

In Step S3, whether the focus ring 8 is operated to reach a position corresponding to the close end or the infinite end is determined based on the position information of the driven focus lens unit 3.

When the focus ring 8 is not operated to reach the position corresponding to the close end or the infinite end, the process returns to Step S1. When the focus ring 8 is operated to reach one of the positions, the process proceeds to Step S4. In Step S4, whether the position is at the close side end or the infinite side end is determined. When the position is at the close side end, the process proceeds to Step S5. On the other hand, when the position is at the infinite side end, the process proceeds to Step S7.

In Step S5, the electromagnetic coil 17a for locking on the close end side is excited to lock the close side brake disc 12 in Step S6. Then, the process proceeds to Step S9.

In Step S7, the electromagnetic coil 17b for locking on the infinite end side is excited to lock the infinite side brake disc 14 in Step S8. Then, the process proceeds to Step S9.

In Step S9, whether the focus ring 8 is operated in a direction opposite to the direction in which the locked regulation pin is provided, specifically, whether a reversal operation occurs is determined based on the output of the encoder. When the reversal operation is performed, the process proceeds to Step S10 where the locking of the close side brake disc 12 or the infinite side brake disc 14 is released. Then, the process returns to Step S1. On the other hand, when the reversal operation is not performed, the process proceeds to Step S11 where a locked state of the brake disc is maintained. Then, the process returns to Step S9.

Figure 5A:
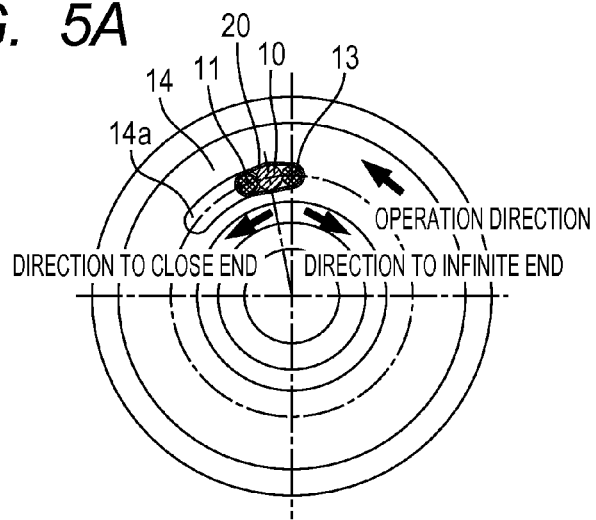
FIG. 5A is a state diagram illustrating a forward operation of the projection portion and the regulation pins in a non-locked state according to the first embodiment.
Figure 5B:
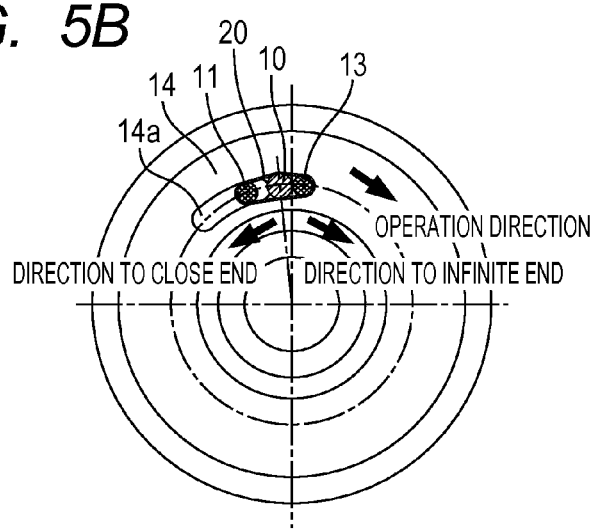
FIG. 5B is a state diagram illustrating a reversal operation of the projection portion and an operation of the regulation pins in a locked state.
Figure 5C:
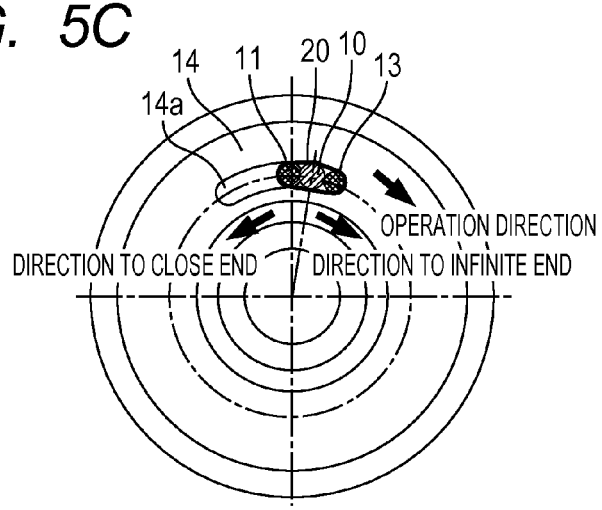
FIG. 5C is a state diagram illustrating an interlocking operation between the regulation pins and the projection portion after release of locking.

In FIGS. 5A, 5B and 5C, an interlocking operation between the close side regulation pin 11 and the projection portion 10 and between the infinite side regulation pin 13 and the projection portion 10 in the reversal operation from the close end or the infinite end is described.

When the focus ring 8 is operated in the direction to the close side to reach the close side at the position illustrated in FIG. 5A, the close side brake disc is brought into a locked state. As a result, the regulation pin 11 cannot be rotated any more. Thereafter, when the reversal operation is performed in the direction to the infinite side as illustrated in FIG. 5B, the locking of the close side regulation pin 11 is not released quickly enough immediately after the start of the reversal operation due to a response time of detection time control of the reversal operation or the like. As a result, the close side regulation pin 11 is temporarily released from the contact state with the projection portion 10 which rotates to the infinite side.

At this time, the elastic retention member 20 is an elastic member corresponding to a non-interlocking unit. Therefore, the close side regulation pin 11, the projection portion 10, and the infinite side regulation pin 13 are elastically connected to each other by the elastic force acting in a direction in which the distances therebetween are reduced. Therefore, when the rotational operation of the projection portion 10 is performed in the direction to the infinite side, a tensile force toward the projection portion 10 is exerted on the close side regulation pin 11 by the elastic retention member 20. By setting the force smaller than the operation force for the focus ring 8 (for example, about 10 g·cm for the operation force of 300 g·cm), operability is prevented from being affected thereby.

Then, as illustrated in FIG. 5C, after the locking is released, the close side regulation pin 11 is brought back into the contact state with the projection portion 10 by the elastic force (tensile force) of the elastic retention member 20 to be driven interlockingly with the return to the contact state.

The first embodiment has the effects of providing the focus operation portion enabling a seamless operation while maintaining the relative position between the lens position and the operation position without an unnatural operational feeling such as a feeling of locking the focus ring when the reversal operation is performed from the close end or the infinite end in the focus operation portion which can be operated switchably between the autofocus operation and the manual focus operation.

Moreover, by configuring an image pickup system including the lens apparatus according to the first embodiment and an image pickup apparatus connected to the lens apparatus, the image pickup system which can perform the effects of the present invention can be realized.

Second Embodiment

Hereinafter, a lens apparatus according to a second embodiment of the present invention is described referring to FIGS. 6A and 6B.

Figure 6A:
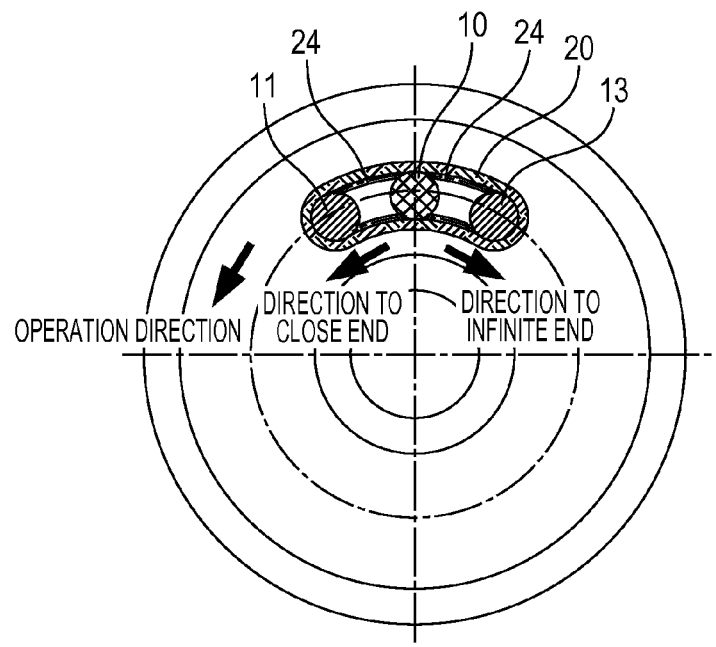
FIG. 6A is a state diagram illustrating an interlocking operation of a connection portion according to a second embodiment of the present invention.
Figure 6B:
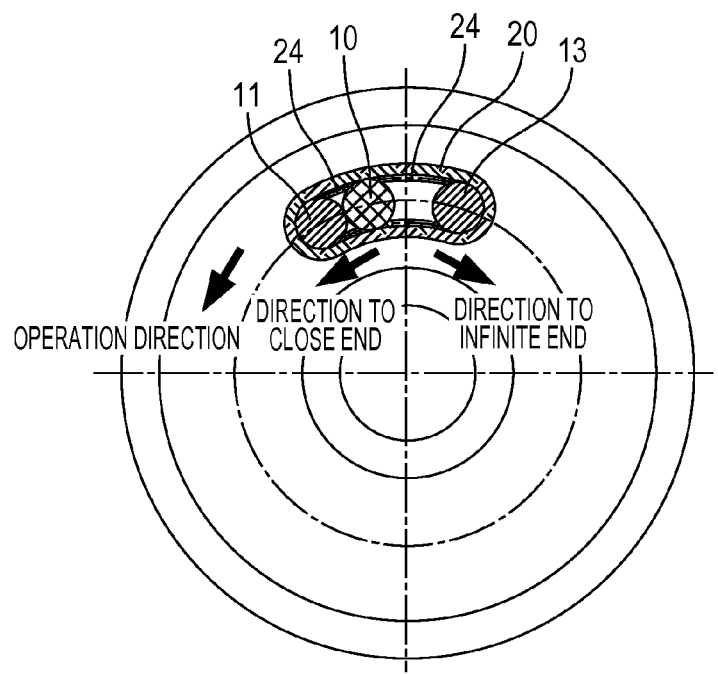
FIG. 6B is a state diagram of the regulation pins and the projection portion at the time of locking.

In FIGS. 6A and 6B, a configuration of the second embodiment includes springs 24 (second and third elastic members) which are non-contact units, in addition to the configuration of the first embodiment. The springs 24 are respectively provided between the close side regulation pin 11 and the projection portion 10, and between the infinite side regulation pin 13 and the projection portion 10. The remaining configuration is the same as that described in the first embodiment.

When the projection portion 10 is rotated in the direction to the close end in the above-mentioned configuration, as illustrated in FIG. 6A, the close side regulation pin 11 and the infinite side regulation pin 13 are rotated while maintaining the non-contact state with the projection portion 10 owing to the springs 24 as the elastic members.

Thereafter, the close side regulation pin 11 reaches a position at which the close side regulation pin 11 inhibits the operation of the projection portion 10 at the close end. Then, as illustrated in FIG. 6B, the rotation in the direction to the close end is inhibited when the projection portion 10 pushes the spring 24 to come into contact with the close side regulation pin 11a little after the close side regulation pin 11 is locked.

According to the second embodiment, the same effects as those of the first embodiment are obtained.

Further, the range of operation is limited by the abutment of the projection portion against the regulation pin after the rotation of the regulation pin is locked. As a result, the same degree of operability as that of the conventional manual focus operation can be obtained. In the configuration of the second embodiment, the focus ring is not rotated in a state in which the autofocus operation is performed. Therefore, forces are balanced among the projection portion 10 fixed to the focus ring 8, the close side regulation pin 11 and the infinite side regulation pin 13. Accordingly, the projection portion 10, the close side regulation pin 11 and the infinite side regulation pin 13 are separated away from each other, as illustrated in FIG. 6A. Specifically, when the focus mode is switched from the autofocus mode to the manual focus mode, the projection portion 10, the close side regulation pin 11 and the infinite side regulation pin 13 are separated away from each other, as illustrated in FIG. 6A. Therefore, even in the case where the focus position is at the close end immediately before the switching to the manual focus mode, the focus ring can be rotated to the close end side immediately after the switching to the manual focus mode even though the rotation can be performed at an extremely small angle. At the time of the state from that illustrated in FIG. 6A to that illustrated in FIG. 6B, the rotation of the focus ring 8 in the direction to the close end is not allowed any more. Therefore, a state in which the rotation cannot be performed in a given direction can be avoided immediately after the switching to the manual focus mode. Therefore, an operator can obtain the effects of starting the manual focus operation with an operational feeling without any discomfort.

Further, by configuring an image pickup system including the lens apparatus according to the second embodiment and an image pickup apparatus connected to the lens apparatus, the image pickup system which can perform the effects of the present invention can be realized.

Third Embodiment

Figure 7:
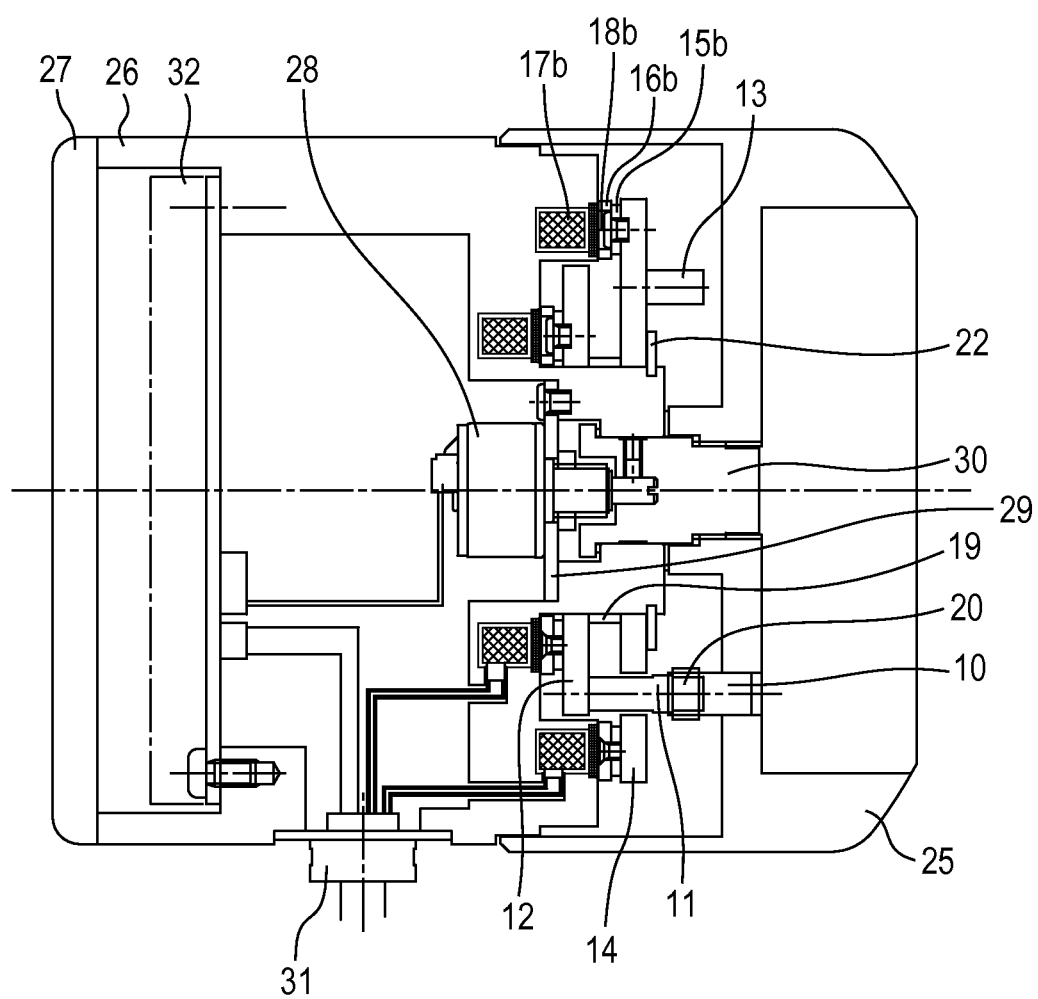
FIG. 7 is a sectional view of a focus controller according to a third embodiment of the present invention.

Hereinafter, the case where a focus controller according to a third embodiment is configured to have the mechanism of the present invention is described referring to FIG. 7.

The focus controller according to the third embodiment is a controller for performing a focus operation of a lens apparatus (not shown) including a focus lens. The focus controller includes an operation nob 25 as an operation portion, the projection portion 10 integrated with the operation nob 25, a controller main body 26, and a lid 27 fixed to the controller main body 26.

Angle information of the operation nob 25 is output to the lens apparatus by an encoder 28. The encoder 28 is mounted to the controller main body 26 by a fixing plate 29 and is connected to the operation nob 25 by a connection shaft 30.

A communication with the lens apparatus through an intermediation of a connector 31 is established for a signal such as position information of the driven focus lens unit of the lens apparatus (not shown). The CPU 32 uses the position information of the focus lens of the lens apparatus, the output from the encoder, and the like to perform a computation process, to thereby control an electromagnetic brake.

The other components are denoted by the same reference numerals as those of the first embodiment, and the description thereof is herein omitted.

In the above-mentioned configuration, when the focus operation mode is changed into the manual focus mode by the operation of the changeover switch (not shown) or the like wherein the focus is operated through the operation of the focus controller in the manual focus mode, the position information of the driven focus lens unit 3 (information of the focus position) is transmitted from the lens apparatus to the CPU 32.

Based on the position information of the driven focus lens unit 3 received from the lens apparatus, the CPU 32 computes a position at which the close side brake disc 12 and the infinite side brake disc 14 are to be locked by the electromagnetic brake. When the close side brake disc 12 or the infinite side brake disc 14 reaches the position corresponding to the close end or the infinite end (the amount of operation by the operation nob 25) by the focus operation with the operation nob 25, the corresponding one of the close side brake disc 12 and the infinite side brake disc 14 is locked. Then, when the reversal operation is started, the locking of the close side brake disc 12 or the infinite side brake disc 14 is released.

In the description given above, when the manual focus mode is selected, the information of the focus position of the driven focus lens unit 3 is transmitted from the lens apparatus to the CPU 32 of the focus controller. Thereafter, the amount of change in focus is computed from the amount of operation of the operation nob 25. While the relative relationship (position difference) between the operation nob 25, and the close side focus end and the infinite side focus end is sequentially computed, any one of the brake discs 12 and 14 is locked at the position corresponding to the focus end, at which the operation nob 25 is operated. However, the present invention is not limited to the above-mentioned case. The position information of the driven focus lens unit 3 may be received from the lens apparatus in predetermined cycles for the fine adjustment of the focus position corresponding to the computation of the CPU 32 as needed.

Moreover, by configuring an image pickup system including the lens apparatus, the focus controller according to the third embodiment for performing the focus operation of the lens apparatus, and an image pickup apparatus, the image pickup system which can perform the effects of the present invention can be realized.

According to the third embodiment, the same effects as those of the first embodiment can be obtained.

Although the preferred embodiments of the present invention are described above, the present invention is not limited to the embodiments described above and various changes and modifications are possible without departing from the scope of the present invention.

For example, even in the case where an external operation which does not allow the maintenance of the relative relationship with the range of manual operation, such as a modification of a change ratio with respect to the entire focus range, switching of the rotating direction between the close side and the infinite side, and a preset function, is performed, the seamless operation can be ordinarily performed by obtaining the position information of the lens.

Although the focus lens in which a driven member moves during focusing is described above, the present invention is not limited thereto.

The driven member also includes members such as zoom lens (zoom lens unit which moves during zooming), iris diaphragm which moves during adjusting quantity of beam (adjustable stop, stop having a changeable aperture diameter) and other members which can be driven.

In addition, two mechanical ends of the driven member correspond to the infinite end and the close end in the case where the driven member is the focus lens whereas the two mechanical ends of the driven member correspond to the telephoto end and the wide-angle end in the case of the zoom lens and correspond to an end where the stop is opened most (open end) and an end where the stop is closed most (close end) in the case of iris diaphragm.

Further, the position (angle) at which the regulation pin is locked changes depending on the cases. Therefore, a function of displaying the locking position and the position of the operation portion may be provided so that a user can sensuously know the operation angle to the locking position.

Moreover, the present invention can also be realized by executing the following process. Specifically, software (program) for realizing the functions of the above-mentioned embodiments is provided to the system or the apparatus through an intermediation of a network or various storage mediums. A processing unit (CPU, MPU, or the like) of the system or the apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-170425, filed Jul. 29, 2010, which is hereby incorporated by reference herein in its entirety.

What is claimed is:

1. A lens apparatus comprising:
   an optical member;
   a driving unit that drives the optical member;
   a position detector that detects a position of the optical member;
   an operation portion configured to rotate toward a first direction and a second direction opposite to the first direction;
   a rotation portion configured to rotate interlockingly with an operation of the operation portion;
   a rotation detector that detects a rotation amount of the operation portion;
   a driving controller configured to control the driving unit to drive the optical member based on the rotation amount of the operation portion detected by the rotation detector, the driving controller driving the optical member toward a first end upon the operation portion being rotated in the first direction and driving the optical member toward a second end upon the operation portion being rotated in the second direction;
   a first regulator disposed on a side of the first direction of the rotation portion, the first regulator rotating in the first direction while abutting to the rotation portion during the rotation of the rotation portion in the first direction;
   a second regulator disposed on a side of the second direction of the rotation portion, the second regulator rotating in the second direction while abutting to the rotation portion during the rotation of the rotation portion in the second direction; and
   a lock controller configured to control the first and second regulators based on the position of the optical member detected by the position detector to lock the first regulator upon the optical member reaching the first end and lock the second regulator upon the optical member reaching the second end.

2. A lens apparatus according to claim 1, wherein the optical member is any one of a focus lens, a zoom lens or an iris diaphragm.

3. A lens apparatus according to claim 1, wherein the optical member is a zoom lens which moves during zooming, and the first end and the second end are a wide-angle end and a telephoto end of the zoom lens, respectively.

4. A lens apparatus according to claim 1, wherein the optical member is a movable stop member, and the first end and the second end are an open end and a close end of the movable stop member, respectively.

5. A lens apparatus according to claim 1, further comprising:
   a first elastic member,
   wherein the first elastic member surrounds the first regulator, the rotation portion and the second regulator.

6. A lens apparatus according to claim 1, wherein the lock controller is configured to control the first and second regulator based on the position of the optical member detected by the position detector to lock the first regulator, while not locking the second regulator, upon the optical member reaching the first end and to lock the second regulator, while not locking the first regulator, upon the optical member reaching the second end.

7. An image pickup system comprising:
   a lens apparatus; and
   an image pickup apparatus connected to the lens apparatus,
   wherein the lens apparatus comprises:
   an optical member;
   a driving unit that drives the optical member;
   a position detector that detects a position of the optical member;
   an operation portion configured to rotate toward a first direction and a second direction opposite to the first direction;

a rotation portion configured to rotate interlockingly with an operation of the operation portion;

a rotation detector that detects a rotation amount of the operation portion;

a driving controller configured to control the driving unit to drive the optical member based on the rotation amount of the operation portion detected by the rotation detector, the driving controller driving the optical member toward a first end upon the operation portion being rotated in the first direction and driving the optical member toward a second end upon the operation portion being rotated in the second direction;

a first regulator disposed on a side of the first direction of the rotation portion, the first regulator rotating in the first direction while abutting to the rotation portion during the rotation of the rotation portion in the first direction;

a second regulator disposed on a side of the second direction of the rotation portion, the second regulator rotating in the second direction while abutting to the rotation portion during the rotation of the rotation portion in the second direction; and a lock controller configured to control the first and second regulators based on the position of the optical member detected by the position detector to lock the first regulator upon the optical member reaching the first end and lock the second regulator upon the optical member reaching the second end.

\* \* \* \* \*